US011963277B2

(12) United States Patent
Yang et al.

(10) Patent No.: US 11,963,277 B2
(45) Date of Patent: Apr. 16, 2024

(54) LIGHTING APPARATUS

(71) Applicant: LEEDARSON LIGHTING CO., LTD., Fujian (CN)

(72) Inventors: Shixue Yang, Fujian (CN); Junjie Guo, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 54 days.

(21) Appl. No.: 17/589,664

(22) Filed: Jan. 31, 2022

(65) Prior Publication Data

US 2022/0248517 A1 Aug. 4, 2022

(30) Foreign Application Priority Data

Jan. 29, 2021 (CN) ......................... 202110130582.5

(51) Int. Cl.
*H05B 45/44* (2020.01)
*H05B 45/37* (2020.01)

(52) U.S. Cl.
CPC ............. *H05B 45/44* (2020.01); *H05B 45/37* (2020.01)

(58) Field of Classification Search
CPC .... H05B 45/44; H05B 45/37; H05B 45/3725; H05B 45/30; H05B 45/40
See application file for complete search history.

(56) References Cited

U.S. PATENT DOCUMENTS

2012/0139448 A1* 6/2012 Chiang .................. H05B 45/48 315/307
2014/0239847 A1* 8/2014 Kim ................... H05B 45/3725 315/297
2015/0245442 A1* 8/2015 Hsu ........................ H05B 45/10 315/294
2020/0146123 A1* 5/2020 Chen .................. H05B 45/3725

* cited by examiner

*Primary Examiner* — Minh D A
(74) *Attorney, Agent, or Firm* — Chun-Ming Shih; LANWAY IPR SERVICES

(57) ABSTRACT

A lighting apparatus includes a rectifier, a loading module and a current supplemental module. The rectifier is connected to an output of the AC power for receiving an AC signal. The rectifier converts the AC signal to a positive wave signal. The loading module is disposed at an output of the rectifier. The loading module includes multiple loading units connected in series. Output of each loading unit is connected to a current limit module. Each current limit module has a voltage conductive threshold and a working cycle dispatched to each current limit module according to the positive wave signal. The current supplemental module is connected to an output of the rectifier and an input of the loading module. The current supplemental module charges the current limit module during the working cycle and outputs current to the loading module when the positive wave signal is not sufficient to drive the loading module.

19 Claims, 6 Drawing Sheets

LIGHTING APPARATUS

FIELD

The present invention is related to a lighting apparatus, and more particularly related to a lighting apparatus with a stable power input.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Light devices are widely used in various areas. For some places, the electricity supply is stable, but this is not true in all areas.

Therefore, it is useful to design a driver circuit that may converts the AC power to a stable driving current used for driving LED modules.

SUMMARY

In some embodiments, a lighting apparatus includes a rectifier, a loading module and a current supplemental module.

The rectifier is connected to an output of the AC power for receiving an AC signal.

The rectifier converts the AC signal to a positive wave signal.

The loading module is disposed at an output of the rectifier.

The loading module includes multiple loading units connected in series.

Output of each loading unit is connected to a current limit module.

Each current limit module has a voltage conductive threshold and a working cycle dispatched to each current limit module according to the positive wave signal.

The current supplemental module is connected to an output of the rectifier and an input of the loading module.

The current supplemental module charges the current limit module during the working cycle and outputs current to the loading module when the positive wave signal is not sufficient to drive the loading module.

In some embodiments, the input of the current limit module is connected to an output of the corresponding loading unit and an input of a corresponding next loading unit to form a working loop with the corresponding loading unit.

In some embodiments, the current limit module includes a current source, a switch unit and a voltage detector.

The current source is series connected the the working loop.

The voltage detector turns on or turns off the switch unit according to voltage of the working loop.

In some embodiments, the current supplemental module includes a first capacitor, an input of the first capacitor is connected between the rectifier and the loading module.

In some embodiments, the current supplemental module includes a charging current source series connected to a back end of the first capacitor.

In some embodiments, the current supplemental module includes a capacitor charging unit with a voltage detector to detect input voltage of the loading module and with a switch unit series connected to a back end of the charging end of the charging current source.

In some embodiments, the voltage detector determines whether to turn on the switch unit to charge the first capacitor by detecting the input voltage of the loading module.

In some embodiments, the current supplemental module includes a capacitor power supply unit with a switch control loop and current detector.

The switch control loop is placed between an input of the first capacitor and the loading module.

In some embodiments, the current detector detects a passing current through the first loading unit of the series connected loading units to determine whether to turn on the switch of the switch control loop to use the switch control loop to charge the loading unit.

In some embodiments, the current supplemental module includes a second capacitor.

An input of the second capacitor is placed between the rectifier and the loading module.

In some embodiments, the current supplemental module includes a back-to-back NMOS circuit series connected to the second capacitor.

In some embodiments, the current supplemental module includes a capacitor charge-discharge control unit connected to the gate of the back-to-back NMOS circuit to control the back-to-back NMOS circuit.

In some embodiments, the capacitor charge-discharge unit detects a passing current passing through the first loading unit of the series connected loading units.

In some embodiments, the passing current is used to determine turning on or turning off the back-to-back NMOS circuit to respectively charge the second capacitor or to use the second capacitor to charge the loading unit.

In some embodiments, the loading units respectively includes at least one LED module.

In some embodiments, the AC power is not stable.

In some embodiments, the loading module receives a stable current even the AC power is not stable.

In some embodiments, the loading module receives a less-variant current than the positive wave signal.

In some embodiments, the loading unit includes a wireless circuit.

In some embodiments, the wireless circuit is further coupled to a third capacitor.

DETAILED DESCRIPTION

Driver circuits are important in the design of LED light devices. If the current supplied to the LED modules is not stable, the LED modules are easily to be damaged or their life spans are significantly affected. In addition, people expect LED light devices to emit stable light.

LED modules work in DC (Direct Current) mode. However, most indoor power source is AC (Alternating Current) mode. Therefore, it is found helpful to decrease variant of the AC power on driving LED modules.

Figure 1:
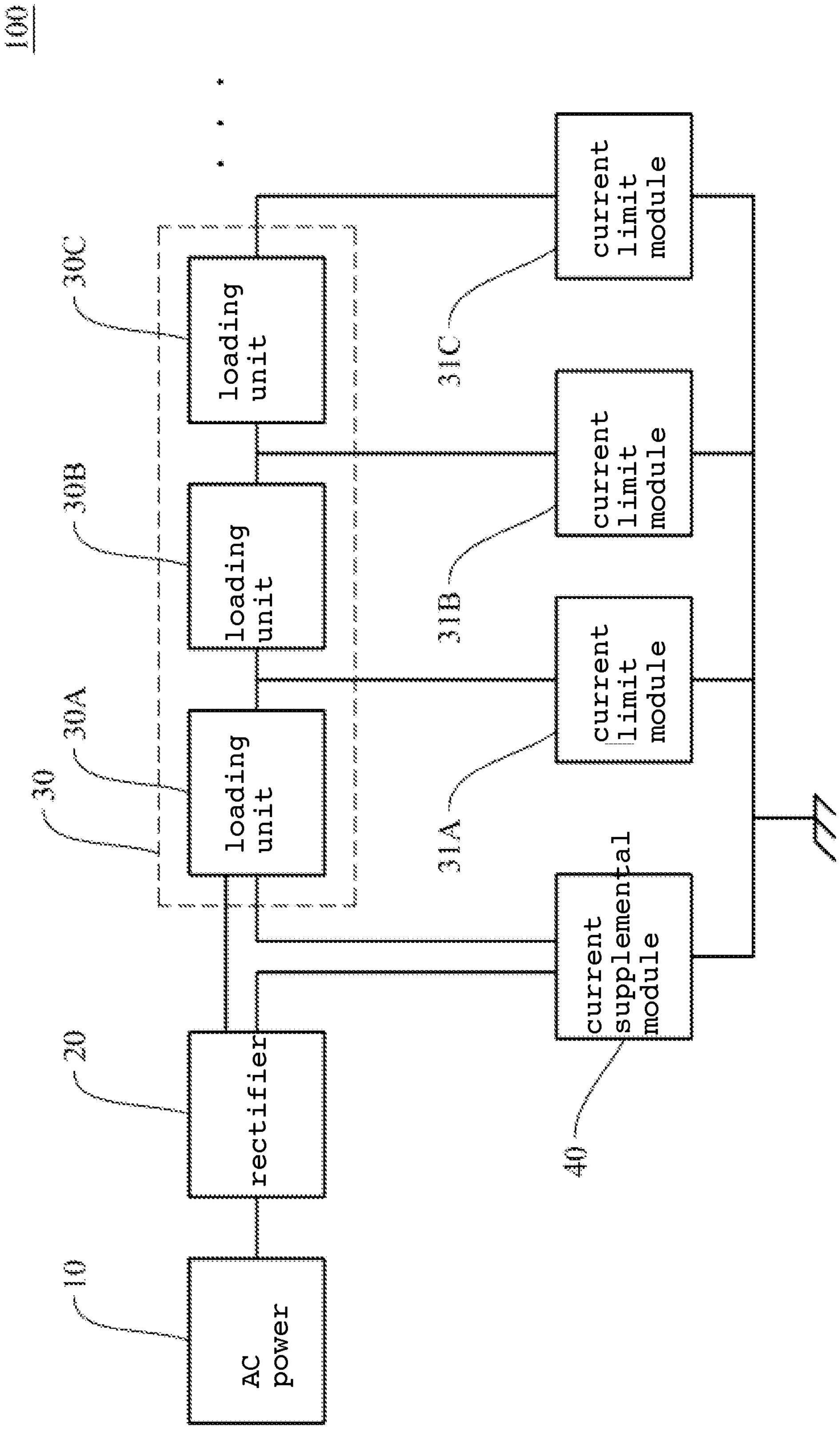
FIG. 1 illustrates a circuit architecture diagram of a lighting apparatus embodiment.
Figure 2:
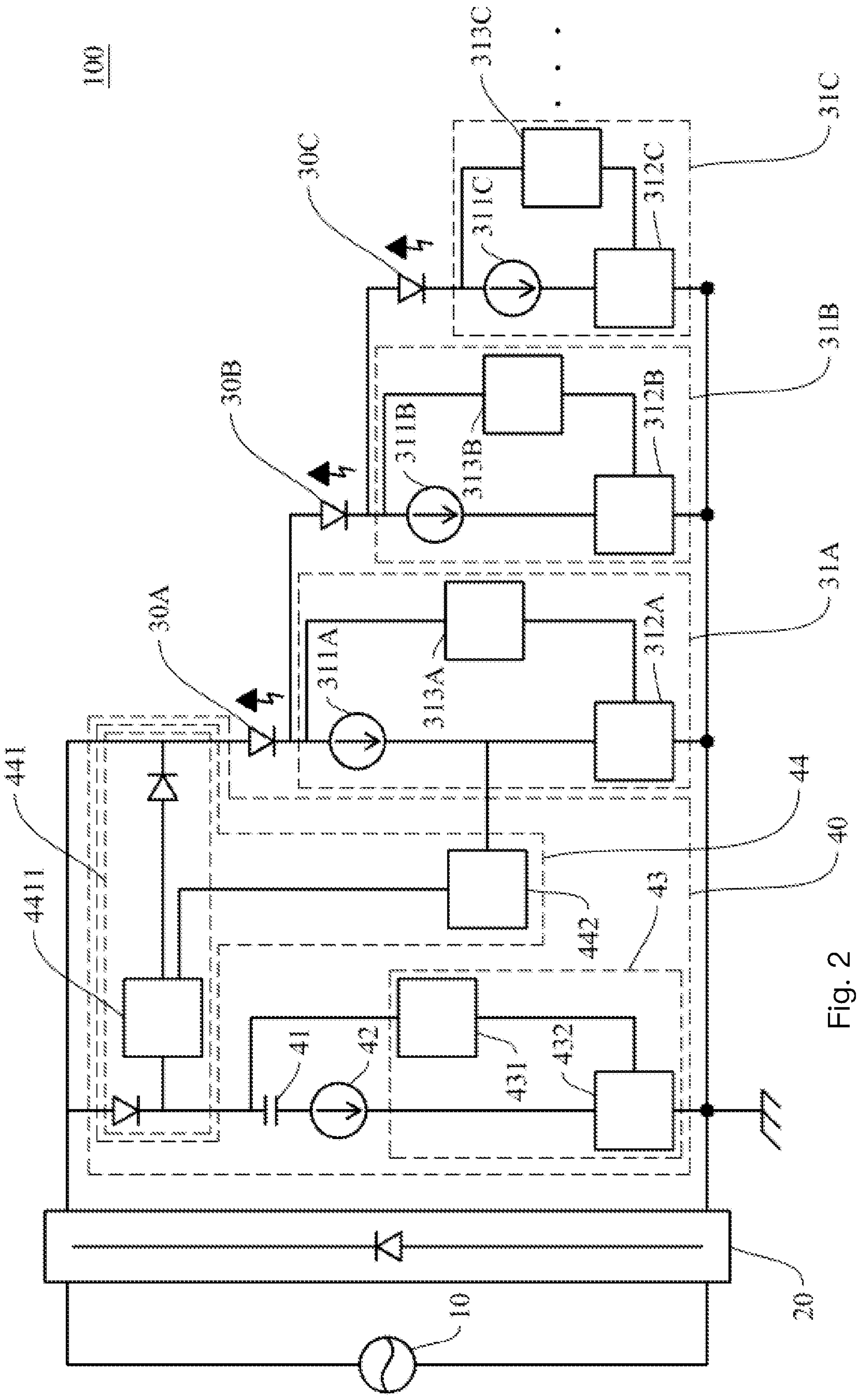
FIG. 2 illustrates a circuit example.

Please refer to FIG. 1. The lighting apparatus 100 receives an AC power 10. The lighting apparatus 100 includes a rectifier 20, a loading module 30 and a current supplemental module 40.

The rectifier 20 is connected to a output of the AC power 10 to receive an AC signal. The rectifier 20 converts the AC signal to a positive wave signal. The rectifier 20 may be a full wave rectifier, a half wave rectifier, a bridge rectifier or other similar devices.

The loading module 30 is placed at output of the rectifier 30. The loading module 30 includes multiple loading units 30A-30C connected in series. An output of each loading unit is connected to a current limit module. Each current limit module has a voltage conductive threshold and a working cycle dispatched to each current limit module based on the positive wave signal.

The input of each current limit module is connected between an output of a corresponding loading unit and an input of a corresponding next loading unit so as to form a working loop with the corresponding loading unit.

Specifically, the input of the current limit module 31A is connected between the loading unit 30A and next loading unit 30B so as to form a first ladder loop with the loading unit 30A.

The input of the current limit module 31B is connected between the loading unit 30B and a next loading unit 30C so that to form a second ladder loop with the loading unit 30B.

Similarly, the input of the current limit module 31C is connected to an output of the loading unit 30C, or between the loading unit 30C and next loading unit depending on ladder number, so as to form a third ladder loop with the loading unit 30C.

Each independent ladder loop respectively correspond to a ladder signal stage. In some embodiments, the loading units 30A-30C respectively include one or more LED modules connected in series or in parallel. In other words, each loading unit may be a single LED light source or multiple LED light sources connected in various combination like series connected.

The current limit module 31A includes a current source 311A, a switch unit 312A and a voltage detector 313A. The current source 311A is series connected and placed on the corresponding working loop. The voltage detector 313A turns on or turns off the switch unit 312A according to the voltage of the working loop.

The current limit module 31C includes a current source 311C, a switch unit 312C and a voltage detector 313C. The voltage detector 313C turns on or turns off the switch unit 312 according to the voltage of the working loop.

In the drawings, there are three loading units and three current limit modules corresponding to three-ladder wave. However, the loading unit and the current limiting module may be any number, e.g. two, four or more than four.

When there are more loading units and corresponding current limit modules, the ladder number may be increased.

The current supplemental module is connected to output of the rectifier 20 and input of the loading module 30. The current supplemental module includes a charging status for working cycles of any current limit module. The current supplemental module may also include output current to the loading module when the positive wave signal is not sufficient to drive the loading module 30.

Figure 4:
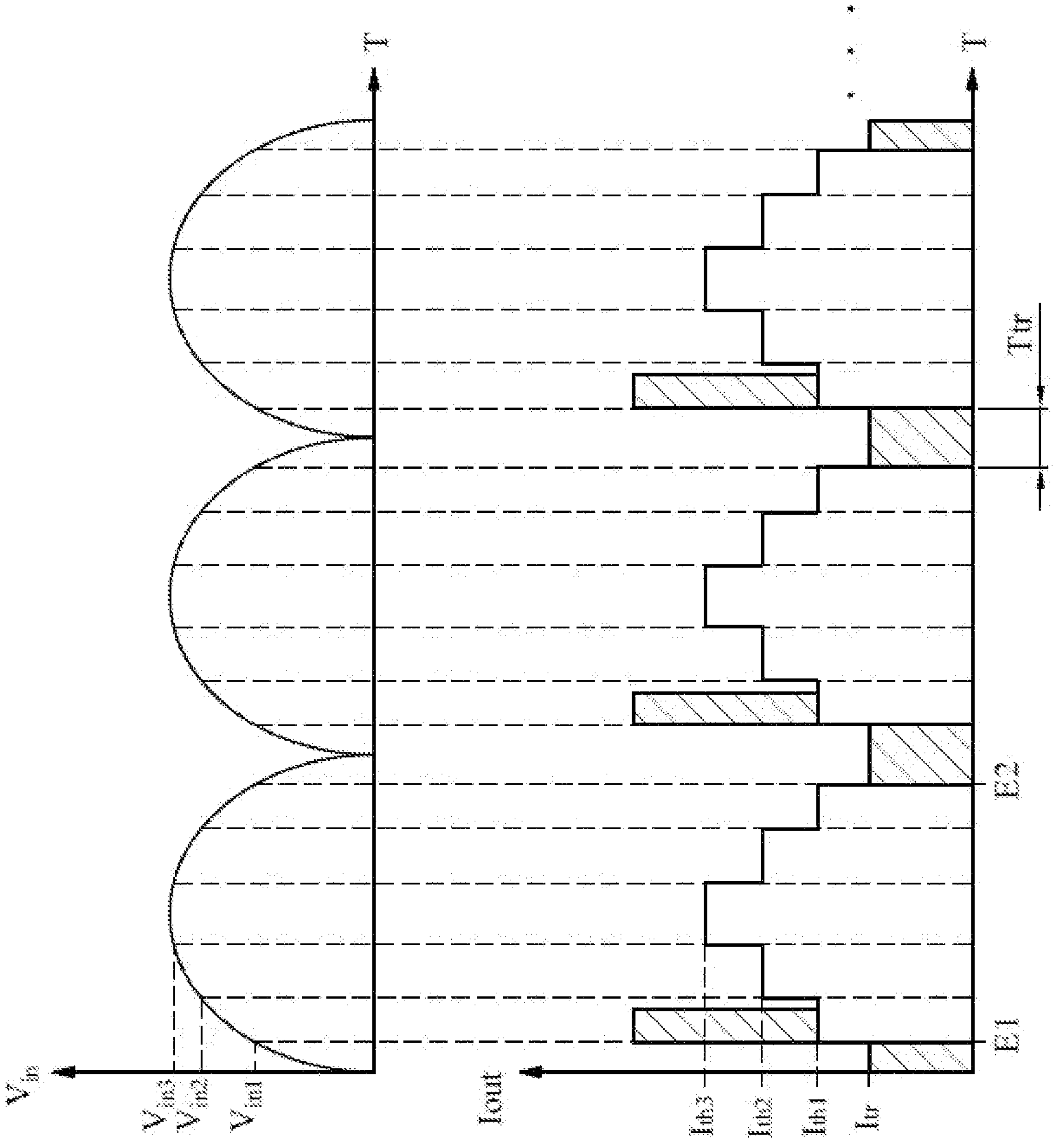
FIG. 4 illustrates a working cycle diagram.

The time period that the positive wave signal is at a valley bottom segments, e.g. Ttr in FIG. 4, in the positive wave signal is referred as the time period not sufficient to drive the loading module 30.

In some embodiments, the current supplemental module 40 includes a first capacitor 41, a charging current source 42, a capacitor charging unit 43 and a capacitor power supply unit 44. An input of the first capacitor 41 is connected between the rectifier 20 and the loading module 30. The charging current source is connected to the back end of the first capacitor 41.

The capacitor charging unit 43 includes a voltage detector 431 and a switch unit 432. The voltage detector 431 is used for detecting an input voltage of the loading module 30. The switch unit 432 is series connected at the back end of the charging current source 42.

The voltage detector 431 determines whether to turn on the switch unit 432 to charge the first capacitor 41 according to input voltage of the loading module in its working cycle. The capacitor power supply unit 44 includes a switch control loop 441 between an input of the first capacitor 41 and the loading unit 30A and includes a current detector 442.

The current detector 442 detects a passing current (current Ith1) of the current limit module 31A series connected to the first loading unit (loading unit 30A), and determines whether to turn on the switch 4411 of the switch control loop 441 so as to use the control loop 441 to supply power to the loading unit 30A. In some embodiments, more than one loading units, e.g. loading units 30A-30C, may be supplied with electricity at the same time, too.

Figure 3:
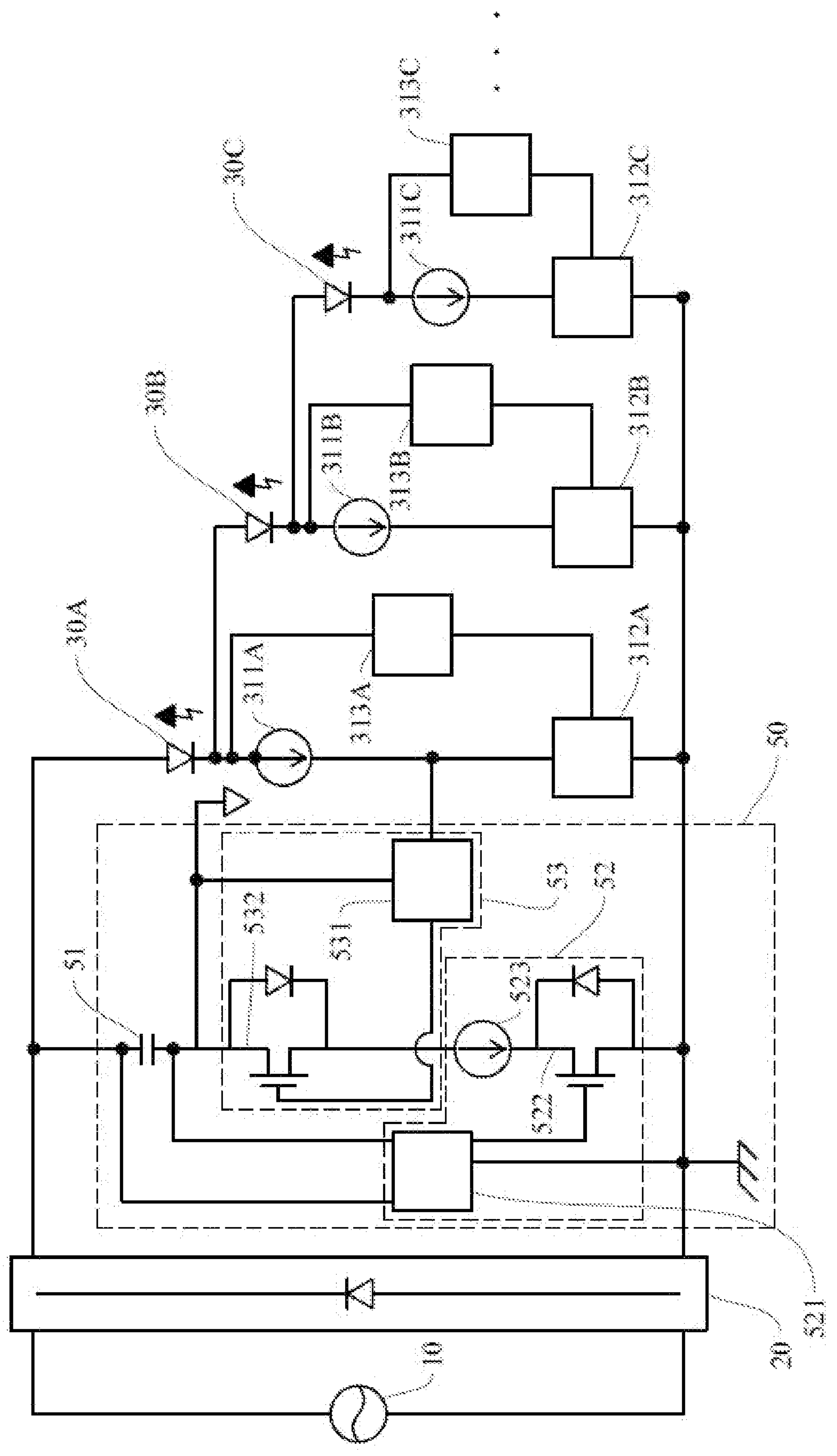
FIG. 3 illustrates another circuit example.

FIG. 3 shows a second embodiment by modifying the current supplemental module 40.

For example, the current supplemental module 50 includes a second capacitor 51, a back-to-back NMOS circuit and a capacitor charging-discharging control unit. The input of the second capacitor 51 is connected between the rectifier 20 and the loading unit 30A.

The back-to-back NMOS circuit and the second capacitor 51 are connected in series. The ground is placed between the back-to-back NMOS circuit and the second capacitor 51. The capacitor charging-discharging control unit is connected to the gate of the back-to-back NMOS circuit to control the turn-on or turn-off of the back-to-back NMOS circuit.

The capacitor charging-discharging control unit also detects a passing current (Ith1) of the current limit module 31A corresponding to the first loading unit (the loading unit 30A). The back-to-back NMOS circuit is turned on or turned off according to the passing current to charge the second capacitor 51 or to use the second capacitor 51 to charge the loading unit 30A.

In some embodiments, more than one loading units may be charged at the same time.

The current supplemental module 50 includes the second capacitor 51, the charging control module 52 and the power supply control module 53. The input of the second capacitor 51 is connected between the rectifier 20 and the loading unit 30A.

The back-to-back NMOS circuit is a charging control module 52. The charging control module 52 includes a first voltage detector 521, a first control switch 522 and a first current source 523. The input and output of the second capacitor 51 are respectively connected to two inputs of the first voltage detector 521. The output of the first voltage detector 521 is connected the gate of the first control switch 522 to turn on or to turn off the first control switch 522.

The capacitor charging-discharging unit may be a power supply control module 53. The power supply control module 53 includes a second voltage detector 531 and as second control switch 532.

The input of the second voltage detector 531 is connected between the power source 311A and the switch unit 312. The input of the second voltage detector 531 is connected to a gate of the second control switch 532 to control the turn-on or turn-off of the second control switch 532.

The first control switch 522 and the second control switch 532 are connected in series. The drain of the first control switch 522 is connected to the drain of the second control switch 532 to form a back-to-back module. The first current source 532 is series connected to the loop of the first control switch 522 and the second control switch 532.

Regarding the switch mode for charging status, when the first voltage detector 521 detects that the input voltage reaches a corresponding time boundary, the first control switch 522 is turned on to charge the second capacitor 51 (i.e. the trigger edge E1 in FIG. 4). The charging path from the high voltage to low voltage is the output of the rectifier 20 to the second capacitor 51, the second control switch, the first current source 523, the first control switch and then to the ground.

When the second capacitor 51 has a voltage (sufficient electricity), the first control switch 522 is turned off to finish the charging process.

Regarding the switch of the power supply status, when the second voltage detector 531 of the power supply control module 53 detects that the passing current Ith1 of the current limit module 31A drops from a high level to a low level or even to zero (i.e. the trigger boundary E2 in FIG. 4), the second control switch 532 is turned on so that the second capacitor 51 discharges the loading module. The discharging path from the high voltage to low voltage is the second capacitor 51, the loadings (loading units 30A, 30B, 30C) and the ground.

When the second voltage detector 531 of the power supply control module detects the passing current Ith1 increases from zero or low level to high level, the second control switch 532 is turned off.

Figure 5:
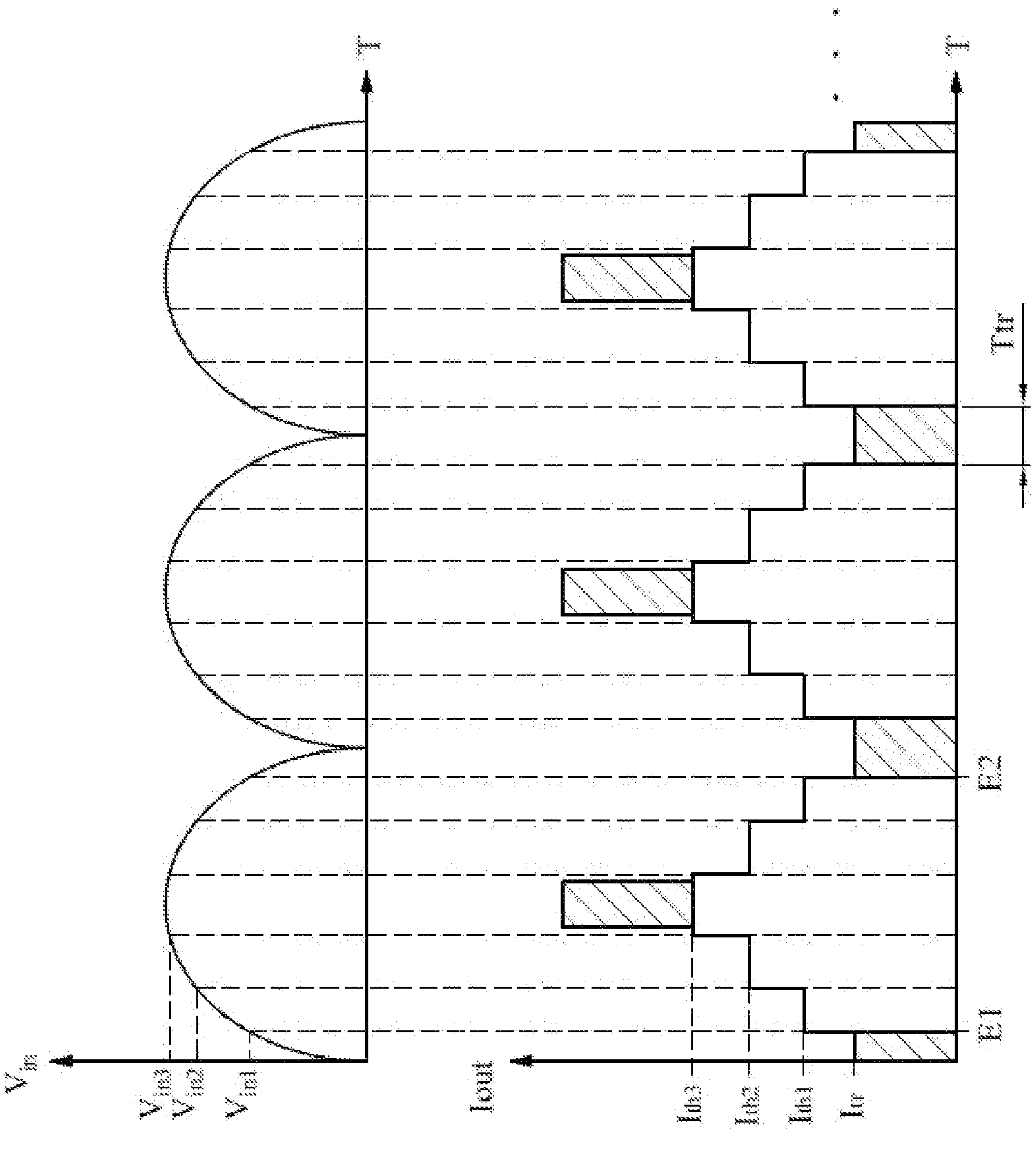
FIG. 5 illustrates another working cycle diagram.
Figure 6:
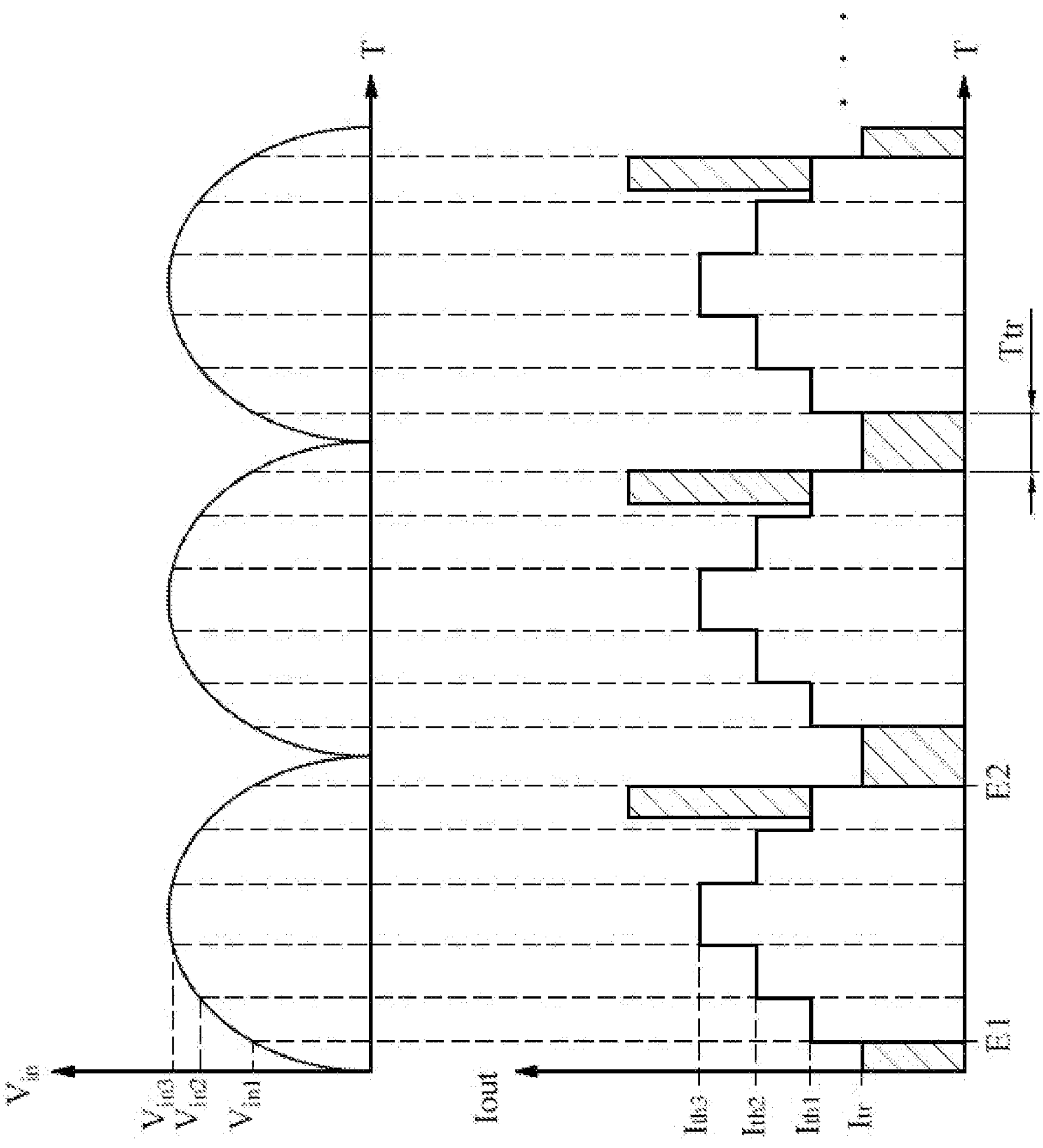
FIG. 6 illustrates another working cycle diagram.

Please refer to FIG. 4, FIG. 5 and FIG. 6 which show a relation between positive wave signals and the ladder signal.

The positive wave signal refers to the input voltage after the rectifier 20. The ladder signal refers to a current signal corresponding to the positive wave signal.

In FIG. 4, the ladder signal is triggered separately according to the current limit modules 31A, 31B and 31C. When the ladder signal is increasing, the current limit module 31A firstly detects the positive wave signal rising to a first threshold voltage Vin1, the current limit module 31A turns on the switch to limit the passing current to the current Ith1 (turn off the current limiting module 31B and the current limit module 31C).

Meanwhile, the current supplemental module 40 detects that the first threshold voltage Vin1 discharging the first capacitor 41 and is turned off after a time period or after the charging is full. Then, the current limit module 31B detects that the positive wave keeps increasing to the second threshold voltage Vint. The current limit module 31B turns on the switch to limit the passing current to the current Ith2 (turn off the current limit module 31A and the current limit module 31C).

Finally, the current limit module 31C detects that the positive wave signal rises to the third threshold voltage level Vin3, the current limit module 31 turns on the switch to limit the passing current to the current Ith3 (turn off the current limit module 31A and the current limit module 31B).

When the ladder signal decrease, the current limit module 31B detects the positive wave signal lowers down to reach the third threshold voltage Vin3, the current limit module 31B turns off the switch so that the current lowers to the current Ith2 (current limit module 31A and the current limit module 31C are turned off).

In some embodiments, as shown in FIG. 5, in addition to charge the first capacitor with the current supplemental module 40, the first capacitor 41 may still be charged in other working cycle.

In some embodiments, as shown in FIG. 6, in addition to charge the first capacitor 41 with the supplemental current module 400, the first capacitor 41 may also be charged during lowering down.

The design implements a full cycle current supply to loading units to prevent blinking or signal variant problems to enhance quality of LED light devices.

In some embodiments, a lighting apparatus includes a rectifier, a loading module and a current supplemental module.

The rectifier is connected to an output of the AC power for receiving an AC signal.

The rectifier converts the AC signal to a positive wave signal.

The loading module is disposed at an output of the rectifier.

The loading module includes multiple loading units connected in series.

Output of each loading unit is connected to a current limit module.

Each current limit module has a voltage conductive threshold and a working cycle dispatched to each current limit module according to the positive wave signal.

The current supplemental module is connected to an output of the rectifier and an input of the loading module.

The current supplemental module charges the current limit module during the working cycle and outputs current to the loading module when the positive wave signal is not sufficient to drive the loading module.

In some embodiments, the input of the current limit module is connected to an output of the corresponding loading unit and an input of a corresponding next loading unit to form a working loop with the corresponding loading unit.

In some embodiments, the current limit module includes a current source, a switch unit and a voltage detector.

The current source is series connected the the working loop.

The voltage detector turns on or turns off the switch unit according to voltage of the working loop.

In some embodiments, the current supplemental module includes a first capacitor, an input of the first capacitor is connected between the rectifier and the loading module.

In some embodiments, the current supplemental module includes a charging current source series connected to a back end of the first capacitor.

In some embodiments, the current supplemental module includes a capacitor charging unit with a voltage detector to detect input voltage of the loading module and with a switch unit series connected to a back end of the charging end of the charging current source.

In some embodiments, the voltage detector determines whether to turn on the switch unit to charge the first capacitor by detecting the input voltage of the loading module.

In some embodiments, the current supplemental module includes a capacitor power supply unit with a switch control loop and current detector.

The switch control loop is placed between an input of the first capacitor and the loading module.

In some embodiments, the current detector detects a passing current through the first loading unit of the series connected loading units to determine whether to turn on the switch of the switch control loop to use the switch control loop to charge the loading unit.

In some embodiments, the current supplemental module includes a second capacitor.

An input of the second capacitor is placed between the rectifier and the loading module.

In some embodiments, the current supplemental module includes a back-to-back NMOS circuit series connected to the second capacitor.

In some embodiments, the current supplemental module includes a capacitor charge-discharge control unit connected to the gate of the back-to-back NMOS circuit to control the back-to-back NMOS circuit.

In some embodiments, the capacitor charge-discharge unit detects a passing current passing through the first loading unit of the series connected loading units.

In some embodiments, the passing current is used to determine turning on or turning off the back-to-back NMOS circuit to respectively charge the second capacitor or to use the second capacitor to charge the loading unit.

In some embodiments, the loading units respectively includes at least one LED module.

In some embodiments, the AC power is not stable.

In some embodiments, the loading module receives a stable current even the AC power is not stable.

In some embodiments, the loading module receives a less-variant current than the positive wave signal.

In some embodiments, the loading unit includes a wireless circuit.

In some embodiments, the wireless circuit is further coupled to a third capacitor to further removing noises in the wireless signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus connected an AC power, comprising:

a rectifier connected to an output of the AC power for receiving an AC signal, wherein the rectifier convers AC voltage to DC voltage;

a loading module, disposed at an output of the rectifier, wherein the loading module comprises multiple loading units connected in series, wherein output of each loading unit is connected to a current limit module, wherein each current limit module has a voltage conductive threshold and a working cycle dispatched to each current limit module according to the positive wave signal; and a current supplemental module connected to an output of the rectifier and an input of the loading module, wherein the current supplemental module charges the current limit module during the working cycle and outputs current to the loading module when DC voltage is not sufficient to drive the loading module, wherein the current supplemental module comprises a second capacitor, wherein an input of the second capacitor is placed between the rectifier and the loading module.

2. The lighting apparatus of claim 1, wherein the input of the current limit module is connected to an output of the corresponding loading unit and an input of a corresponding next loading unit to form a working loop with the corresponding loading unit.

3. The lighting apparatus of claim 2, wherein the current limit module comprises a current source, a switch unit and a voltage detector, wherein the current source is series connected the working loop, wherein the voltage detector turns on or turns off the switch unit according to voltage of the working loop.

4. The lighting apparatus of claim 1, wherein the current supplemental module comprises a first capacitor, an input of the first capacitor is connected between the rectifier and the loading module.

5. The lighting apparatus of claim 4, wherein the current supplemental module comprises a charging current source series connected to a back end of the first capacitor.

6. The lighting apparatus of claim 5, wherein the current supplemental module comprises a capacitor charging unit with a voltage detector to detect input voltage of the loading module and with a switch unit series connected to a back end of the charging end of the charging current source.

7. The lighting apparatus of claim 6, wherein the voltage detector determines whether to turn on the switch unit to charge the first capacitor by detecting the input voltage of the loading module.

8. The lighting apparatus of claim 7, wherein the current supplemental module comprises a capacitor power supply unit with a switch control loop and current detector, wherein the switch control loop is placed between an input of the first capacitor and the loading module.

9. The lighting apparatus of claim 8, wherein the current detector detects a passing current through the first loading unit of the series connected loading units to determine whether to turn on the switch of the switch control loop to use the switch control loop to charge the loading unit.

10. The lighting apparatus of claim 1, wherein the current supplemental module comprises a back-to-back NMOS circuit series connected to the second capacitor.

11. The lighting apparatus of claim 10, wherein the current supplemental module comprises a capacitor charge-discharge control unit connected to the gate of the back-to-back NMOS circuit to control the back-to-back NMOS circuit.

12. The lighting apparatus of claim 11, wherein the capacitor charge-discharge unit detects a passing current passing through the first loading unit of the series connected loading units.

13. The lighting apparatus of claim 12, wherein the passing current is used to determine turning on or turning off the back-to-back NMOS circuit to respectively charge the second capacitor or to use the second capacitor to charge the loading unit.

14. The lighting apparatus of claim 1, wherein the loading units respectively comprises at least one LED module.

15. The lighting apparatus of claim 1, wherein the AC power is not stable.

16. The lighting apparatus of claim 15, wherein the loading module receives a stable current even the AC power is not stable.

17. The lighting apparatus of claim 16, wherein the loading receives less current than the DC voltage or DC current.

18. The lighting apparatus of claim 1, wherein the loading unit comprises a wireless circuit.

19. The lighting apparatus of claim 18, wherein the wireless circuit is further coupled to a third capacitor.

* * * * *